United States Patent [19]

Schulz et al.

[11] 4,306,436

[45] Dec. 22, 1981

[54] METHOD AND APPARATUS FOR REGULATING PRESELECTED LOADS ON FORMING DIES

[75] Inventors: David W. Schulz, Hermosa Beach; Edward D. Weisert, Rolling Hills Estates, both of Calif.

[73] Assignee: Rockwell International Corporation, El Segundo, Calif.

[21] Appl. No.: 148,873

[22] Filed: May 12, 1980

[51] Int. Cl.³ .............................................. B21B 37/08
[52] U.S. Cl. .......................................... 72/21; 72/16; 72/60; 100/269 A
[58] Field of Search ....................... 72/11, 57, 12, 342, 72/16, 364, 21, 60, 63; 228/157, 106; 100/269 A, 269 R

[56] References Cited

U.S. PATENT DOCUMENTS

| | | | |
|---|---|---|---|
| 3,340,101 | 9/1967 | Fields, Jr. et al. | 72/364 X |
| 3,373,480 | 3/1968 | Fuchs, Jr. | 72/60 X |
| 3,376,808 | 4/1968 | Beckett et al. | 100/269 A |
| 3,667,891 | 6/1972 | Gelu | 100/269 A |
| 3,686,907 | 8/1972 | Sokolov et al. | 72/21 X |
| 3,742,537 | 7/1973 | Merrill | 100/204 X |
| 3,927,817 | 12/1975 | Hamilton et al. | 228/157 |
| 3,934,441 | 1/1976 | Hamilton et al. | 72/342 X |
| 3,938,360 | 2/1976 | Shida | 72/21 X |
| 4,036,041 | 7/1977 | Ichiryu et al. | 72/21 X |
| 4,037,444 | 7/1977 | Ledebur | 72/21 |
| 4,087,037 | 5/1978 | Schier | 228/106 |

Primary Examiner—Leon Gilden
Attorney, Agent, or Firm—Charles T. Silberberg

[57] ABSTRACT

An improvement to an apparatus for and method of making structures from at least one workpiece is disclosed. The prior art apparatus and method comprised a pair of dies which were clamped about the periphery of the at least one workpiece creating a gap therebetween. A pair of non-inflatable platens were then used to apply a force against the pair of dies further clamping the workpiece in place. The die assembly and workpiece were then heated to forming temperatures and thereafter the workpiece was formed within the pair of dies by fluid under pressure. Typically the forming was Superplastic Forming or Superplastic Forming/Diffusion Bonding. The improvement to the apparatus and method comprises providing an inflatable platen between one of the dies and one of the non-inflatable platens, adapted to regulate the force applied by said pair of dies to said at least one workpiece. A sensor, mounted within the gap, is adapted to sense changes in the dimensions of the actual gap and provide a first output signal proportional thereto during the forming of the structure. A signal generator is provided for producing a second output signal proportional to a preferred gap dimension that is produced when said force is the minimum amount necessary for forming the at least one workpiece into the structure. A control system is provided to regulate the pressure level within the inflatable platen, and, therefore, the force applied to the pair of dies, using the first and second output signals such that the actual gap substantially equals the preferred gap during forming. In an alternate embodiment, a buffer platen is placed between the die assembly and inflatable platen to isolate the inflatable platen from the heat.

7 Claims, 4 Drawing Figures

METHOD AND APPARATUS FOR REGULATING PRESELECTED LOADS ON FORMING DIES

BACKGROUND OF THE INVENTION

1. Field of Invention

The invention relates to the field of metal forming, and particularly to an improvement to the method and apparatus for forming structures, allowing a reduction in the size and costs of dies.

2. Description of Prior Art

It has been known for many years that certain metals, such as titanium, and other alloys, exhibit superplasticity. Superplasticity is the capability of a material to develop unusually high tensile elongations with a reduced tendency toward necking. This capability is exhibited by only a limited number of metals and alloys, and within limited temperature and strain rate ranges. For example, some titanium alloys, such as Ti-6A1-4V, have been observed to exhibit superplastic characteristics.

Until the advent of viable superplastic forming techniques, taking advantage of this property to form complex configurations requiring large tensile elongations was extremely difficult, or in some instances, not possible. A significant breakthrough in superplastic forming was made by Hamilton, et al., disclosed in U.S. Pat. No. 3,934,441, Controlled Environment Superplastic Forming, incorporated into this specification herewith by reference. Simplified, the process involves placing a metal blank workpiece over a cavity in a die. The blank is heated to a temperature where it exhibits superplastic characterisitcs after which pressure is applied to the blank, causing it to stretch and form into the cavity. This varying pressure is reacted by the tooling and a force reactor system, typically in the form of a hydraulic press.

Another example of superplastic forming is disclosed in U.S. Pat. No. 3,340,101, Thermoforming of Metals, by Filds, Jr., et al.

Diffusion bonding refers to the metallurgical joining of surfaces of similar or dissimilar metals by applying heat and pressure for a sufficient time so as to cause co-mingling of the atoms at the joint interface. Diffusion bonding is accomplished entirely in the solid state at or above one-half the base metal melting point. Actual times, temperatures and pressures will vary from metal to metal.

The combining of superplastic forming and diffusion bonding (SPF/DB) in the making of metallic sandwich structures has been successfully accomplished and is disclosed in U.S. Pat. No. 3,927,817, Method of Making Metallic Sandwich Structures, by Hamilton, et al., and is herein also incorporated by reference.

Basically, the Hamilton, et al. method for making metallic sandwich structures involves fabricating the structures from a plurality of metal blank workpieces. One or more of the blanks are coated in selected areas not to be diffusion bonded. The blanks are positioned in a stacked relationship and placed in a die assembly wherein the stack is contained at its periphery forming a seal thereabout. The stack is diffusion bonded together in the uncoated areas by the application of controlled pressure, and at least one of the blanks is superplastically formed against one or more of the die surfaces forming the sandwich structure. The core configuration is determined by the location, size and shape of the joined areas. Another example of SPF/DB is disclosed in U.S. Pat. No. 4,087,037, Method of and Tools for Producing Superplastically Formed and Diffusion Bonded Structures by Schieve et al. and British Pat. No. 1,398,929, Joining and Forming Sheet Metal Members by L. E. A. Summers, et al.

All the processes involve containing one or more workpieces between a pair of dies with the workpieces creating a gap between the pair of dies. The dies are clamped about the preform, either by direct mechanical fastening to each other as disclosed in U.S. Pat. No. 3,340,101, Thermal Forming of Metals by Fields, Jr. et al., or by placing the dies and workpiece in a press between two platens as disclosed in U.S. Pat. No. 3,927,817, Method of Making Metallic Sandwich Structures, by Hamilton, et al. Regardless of which method is used, once the die and preform are clamped in place, they are effectively restrained from further movement. This creates a problem because the forming operations are carried out at high temperatures. For example, when superplastic forming titanium alloys, such as Ti-6A1-4V, the forming temperatures are around 1600° F. Thus, both the pair of dies and preform will expand. This may create high loads in the dies, and in order to minimize these loads the dies are generally fabricated from a high temperature resistant stainless steel which is expensive and difficult to machine.

Because of the expansion of the dies during forming temperatures, and additionally, the fact that the pressures within the die required for forming typically vary throughout the forming cycle, it is difficult to insure that the structure being formed remains in tolerance, i.e., the structure may distort by virtue of inappropriate die pressure. For example, die pressure which is too high can cause flow forming of the constrained periphery of the part while die pressure which is too low can cause the seal to be lost or slippage of the preform while forming. Thus, in the past, to be sure that the structure remained in tolerance, excessive clamping force was used, aggravating the problem.

Past forming apparatus have not addressed the problem of regulating a preselected force on the dies and maintaining it as internal pressure varies during the forming cycle to insure that only the minimum force necessary to insure that the structure being formed will be within tolerance is applied to the die. For example, U.S. Pat. No. 3,742,537, Static Press by R. E. Merrill, discloses a press comprised of a support plate containing an inflatable hose-like member about its periphery. Coupled to the hose is a mold die adapted to mate with an upper plate. The mold die is brought into contact with the upper plate by inflating the ring. The pressure for forming is obtained by applying pressure between the lower plate and mold die with the ring acting as a seal. While the force against the upper plate can be varied by varying the gas pressure, Merrill does not disclose a method whereby the pressure can or should be regulated to a preselected value during the forming cycle. Furthermore, there is no apparatus for determining the pressure that should be applied during the forming cycle.

Another example can be found in U.S. Pat. No. 3,667,891, Molding Press by R. J. Geltin. Geltin discloses a press having lower and upper platens with a pair of dies mounted in between. A bolster plate is movably mounted on a support frame. Between the bolster plate and the upper platen is a plurality of parallel inflatable flat tubes. In operation, the bolster plate is brought down and locked in proximity of the upper platen and the flat tubes are inflated to apply pressure to the upper platen and subsequently to the die. Here again, while the pressure could be varied by changing the pressure inside the plurality of flat tubes, Geltin also does not disclose an apparatus to accomplish it. Another example of the use of a movable platen with an inflatable member adapted to apply pressure to the die can be found in U.S. Pat. No. 3,376,808, Fluid Operated Press by D. E. Beckett, et al.

It is, therefore, a primary object of this invention to provide a method and apparatus for forming parts with the application of a regulated preselected die clamping force.

It is another object of this invention to provide a method and apparatus for forming parts using smaller and less expensive dies.

It is a further object of this invention to provide a method and apparatus for more accurately producing parts by superplastic forming and superplastic forming/diffusion bonding.

SUMMARY OF THE INVENTION

The invention is an improvement to an apparatus for and method of making structures from at least one workpiece. The prior art apparatus and method comprised a pair of dies which were clamped about the periphery of the at least one workpiece creating a gap therebetween. A pair of non-inflatable platens were then used to apply a force against the pair of dies further clamping the workpiece in place. The die assembly and workpiece were then heated to forming temperatures and thereafter the at least one workpiece was formed within the pair of dies by fluid under pressure. Typically, the forming was SPF or SPF/DB.

The improvement to the apparatus comprises a regulated force adjustment means, preferably an inflatable platen mounted between one of the dies and one of the non-inflatable platens, adapted to regulate the force applied by the pair of dies and to the at least one workpiece. A sensor is mounted within the actual gap which is adapted to sense changes in the dimensions of the gap and provides a first output signal proportional thereto during the forming of the at least one workpiece. A signal generator provides a second output signal proportional to a preferred gap dimension that is produced when the force is the minimum amount necessary for forming the at least one workpiece into said structure. A control means is provided, coupled to and adapted to control the force applied by the inflatable platen, and also coupled to the sensor and signal generator adapted to use the first and second output signals such that the actual gap substantially equals the preferred gap. Preferably, the control means comprises a source of pressurized fluid, a conduit coupling the fluid to the inflatable platen, a valve means mounted in the conduit for controlling the pressure level within the inflatable platen, and a controller adapted to receive the first and second output signals and to provide an input signal to the valve means to control the pressure within the inflatable platen. In an alternate embodiment, a buffer platen is inserted between the die assembly and inflatable platen to isolate the inflatable platen from the heat.

The improvement to the method, therefore, comprises the steps of providing a force adjustment means, preferably an inflatable platen; sensing the actual gap between the pair of dies and providing a first output signal proportional thereto; providing a second output signal proportional to a preferred gap, controlling the force adjustment means; and using the first and second signals such that the actual gap substantially equals the preferred gap. Preferably, the step of controlling the inflatable platen comprises controlling the pressure level within the inflatable platen, preferably by providing a source of pressurized fluid and a conduit coupling the fluid to the inflatable platen, applying the first and second signals to the input of a controller, and applying an output signal of the controller to control a valve means in the conduit to control the pressure within the inflatable platen in response to the output of the controller.

The novel features which are believed to be characteristic of the invention, both as to its organization and its method of operation, together with further objects and advantages thereof, will be better understood from the following description in connection with the accompanying drawing in which a presently preferred embodiment of the invention is illustrated by way of example. It is to be expressly understood, however, that the drawings are for purposes of illustration and description only, and are not intended as a definition of the limits of the invention.

DESCRIPTION OF PREFERRED EMBODIMENT

Figure 1:
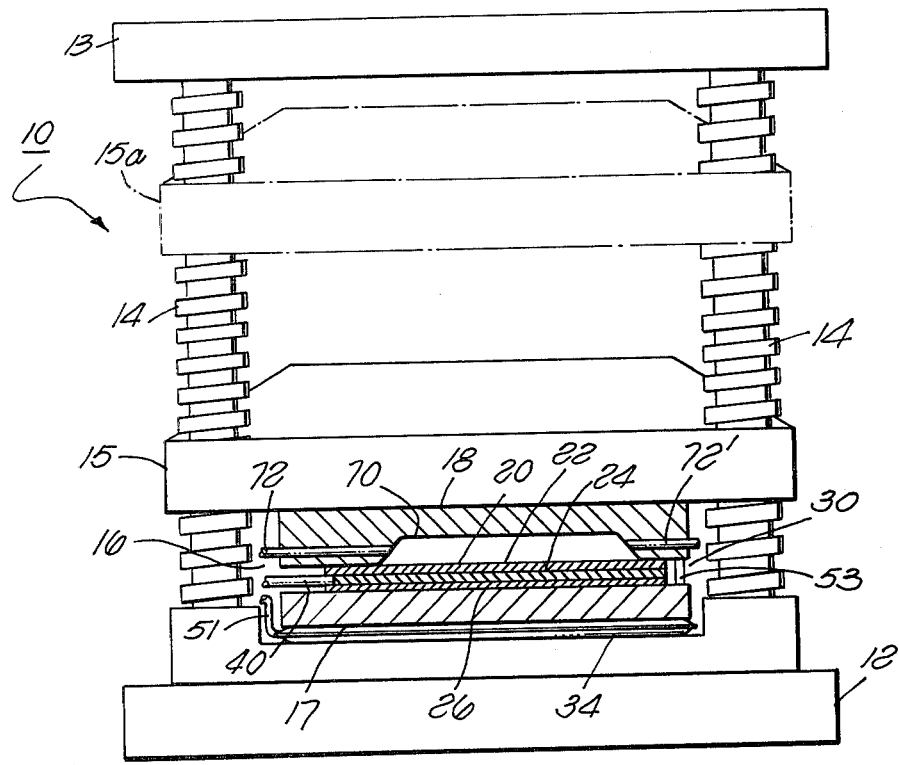
FIG. 1 illustrates a side elevation view of a press having a die assembly with a stack of workpieces mounted therein.

Illustrated in FIG. 1 is a side elevation view of a press, generally indicated by numeral 10. The press 10 consists of a non-inflatable lower platen 12 and upper support member 13. Acme (anti-backlash) screws 14 are rotatably mounted at their ends to both lower platen 12 and to member 13. An upper movable platen 15 is threadably mounted on the acme screws 14. Mounted between the upper and lower platens 15 and 12, respectively, is a die assembly 16, which comprises lower die half 17 and upper die half 18. Mounted between the die halfs 17 and 18 is a stack 20 creating a gap 30 there between. Stack 20 is comprised of metal sheet workpieces 22, 24, and 26. Note that in the SPF/DB process, at least two workpieces are required and there could be more than three. Therefore, the selection of a stack composed of three workpieces is only for purposes of illustration. An inflatable platen 34 is mounted between the lower die half 17 and lower platen 12.

Figure 3:
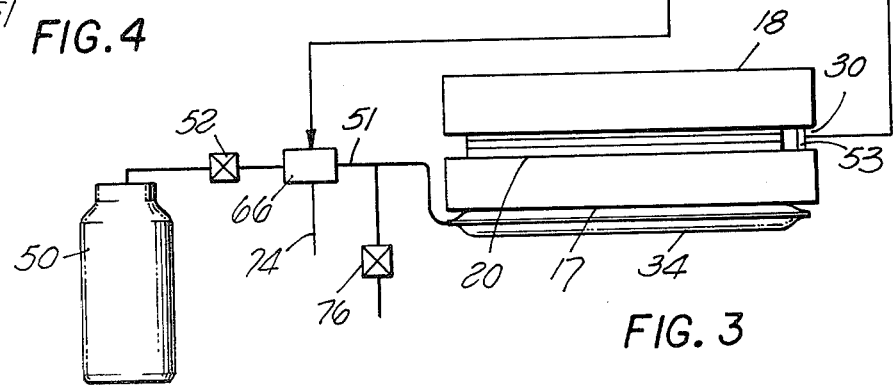
FIG. 3 illustrates a control system for maintaining a constant gap between the die halfs during forming.
Figure 2:
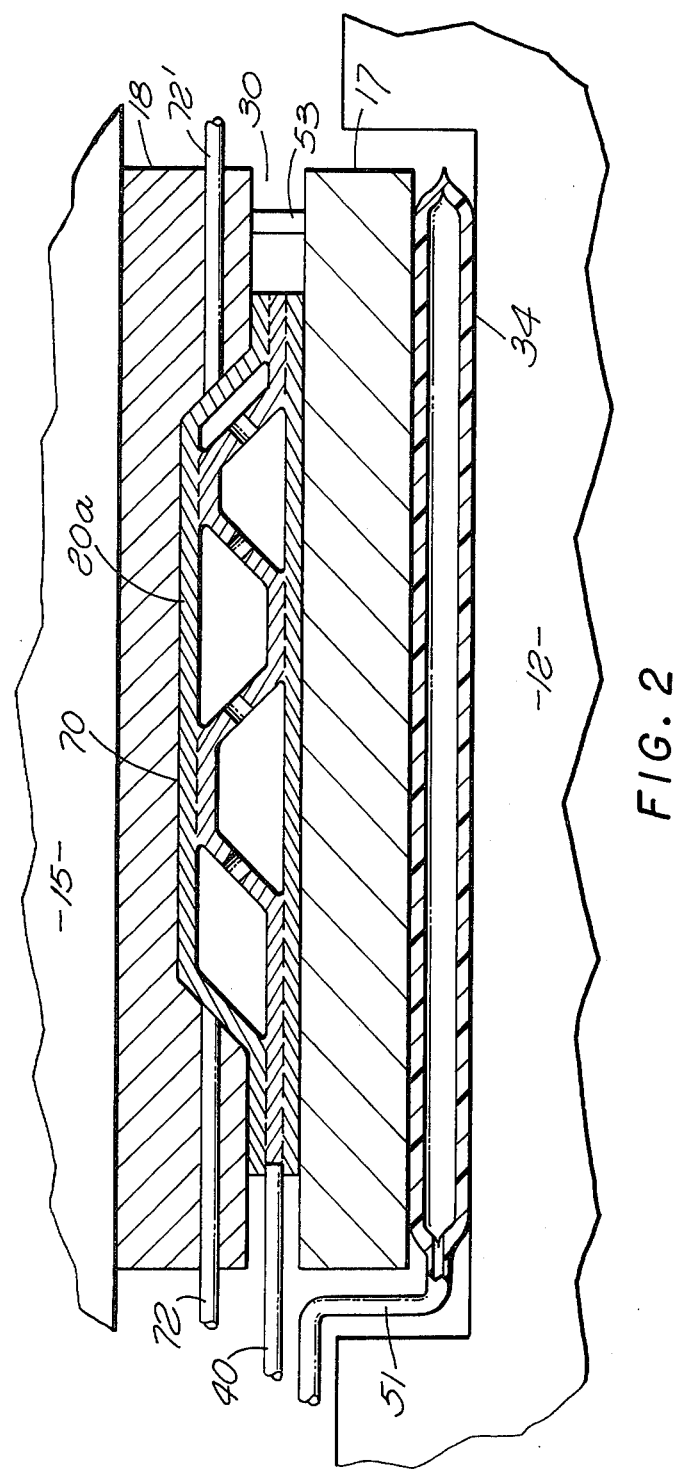
FIG. 2 illustrates an enlarged view of the die assembly shown in FIG. 1 with the stack is formed into a sandwich structure.

SPF/DB, as previously mentioned, is thoroughly discussed in U.S. Pat. No. 3,927,817, Method of Making Metallic Sandwich Structures, by Hamilton, et al., and in other patents, and thus need only be briefly discussed here. Illustrated in FIG. 2 is the stack 20 formed into a sandwich structure 20a within the die assembly 16, while illustrated in FIG. 3 is an apparatus for controlling the clamping force applied to the die assembly 16. Still referring to FIG. 1, and additionally to FIGS. 2 and 3, it can be seen that one or more of the workpieces 22, 24, and 26, are coated with a stopoff material (not shown) in selected areas not to be diffusion bonded. The workpieces 22, 24, and 26, are positioned into the stack 20. An inflation tube 40 is coupled to the stack 20 and connects to one or more of the stopoff paths. The various coated areas are coupled together by small apertures 42.

The platen 34 is coupled to a source of pressurized fluid, either liquid or gas, typically in the form of a pressurized accumulator 50, by means of conduit 51. A valve 52 mounted in the conduit 51 is used to control fluid flow. A gap sensor 53 is mounted in the gap 30 between the die halfs 17 and 18 and provides a first output signal proportional to the gap. The gap sensor 53 can be in the form of a proximity gauge, linear voltage displacement transducer (LVDT) extensometer or any other state of the art gap measuring device. The output signal from the gap sensor 53 is coupled to the input of a controller 60. A reference signal generator 62 is provided which generates a second output signal, coupled to the controller 60, proportional to a preferred gap to be maintained between the die halfs 17 and 18 during forming (to be subsequently discussed in detail). The controller 60, using the first and second output signals, provides a third output signal to a regulator control valve 66 mounted in the conduit 51 for control of fluid pressure within the platen 34.

Thus, in operation, the inflatable platen 34 is at least partially inflated and the die assembly 16, with the stack 20 therein, is placed on top of the inflatable platen 34. The platen 15 is brought down until it contacts the upper die half 18 with preselected force so as to create a seal between the upper and lower dies 18 and 17, respectively, and the stack 20. At this point, the gap 30 is measured and is used as the preferred gap, and the signal generator 62 is set to provide a second output signal proportional thereto. Heat is applied to the die assembly 16, typically by heating elements (not shown) within the die halfs 17 and 18. Pressurized fluid is applied to the cavity 70 of the upper die half 18 via ports 72 and 72'. The pressure and clamping force is maintained on the preform (stack 20) until the uncoated areas are diffusion bonded together. Thereafter, the pressure in the cavity 70 is reduced to ambient and the pressurized fluid is applied to the interior of the stack 20 via tube 40. The gas travels along the stopoff paths through the apertures 42 causing the blanks 24 and 26 to superplastically expand into the cavity 60. During this step, a vacuum may be drawn through ports 72 and 72' to aid in the expansion process.

If during the forming of the stack 20, the gap 30 (the actual gap) becomes greater than the preferred gap, the controller 60 sends the third output signal to regulator control valve 66 causing it to increase gas pressure within the inflatable platen 34 causing the die halfs 17 and 18 to move toward each other. When the gap 30 is again substantially equal to the preferred gap, the controller 60 sends a third output signal to the valve 66 to maintain a constant pressure within the platen 34. Should the gap 30 become too small, the controller will cause valve 66 to reduce the pressure within the platen 34 by dumping fluid to ambient via tube 74.

Thus, with this feedback control circuit, and the corresponding applied force, the gap during the SPF/DB process is held constant, or nearly so. Thus, the load on the die assembly 16 and stack 20 (by assembly 16) is kept to that minimum level (or range) required to accurately form the part. After the part is formed, valve 52 is turned to the off position, and valve 76, coupled to conduit 51 by conduit 77, is opened, reducing the pressure within the inflatable platen to ambient. Thereafter, the temperature is returned to ambient, the upper platen 15 is raised and the completed structure is removed from die half 17.

It must be noted that while the discussion to this point has been concerned with SPF/DB, the procedure is applicable to superplastic forming, for example, as disclosed in U.S. Pat. No. 3,934,441, Controlled Environment Superplastic Forming by Hamilton, et al.

Figure 4:
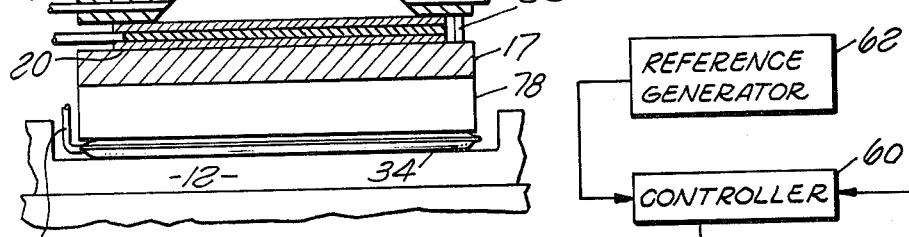
FIG. 4 illustrates a press wherein a buffer platen is provided between the die assembly and inflatable platen.

Illustrated in FIG. 4 is a second embodiment wherein a buffer platen 78 is placed beween the die assembly 16 and inflatable platen 34. The buffer platen 78 serves to isolate the inflatable platen 34 from the heat. It is especially important if an incompressible fluid is used as the pressurizing fluid.

Having thus described the invention, it is obvious that numerous modifications and departures may be made by those skilled in the art; thus, the invention is to be construed as being limited only by the spirit and scope of the appended claims.

What is claimed is:

1. In the method of making a structure from at least one workpiece wherein said at least one workpiece is constrained about its periphery between a pair of dies creating an actual gap therebetween, said dies applying a clamping force to said at least one workpiece, said dies being constrained between a pair of non-inflatable platens, and said at least one workpiece is formed within said pair of dies by fluid under pressure, the improvement comprising:

providing force adjustment means to adjust the force applied by said dies to said at least one workpiece for varying said actual gap between said pair of dies;

sensing the actual gap between said dies during forming, and providing a first output signal proportional to the size of said actual gap;

providing a second output signal proportional to a preferred gap size between said dies that is produced when said force is the minimum amount necessary for acceptable forming of said at least one workpiece; and controlling said force adjustment means using said first and second signals such that the actual gap size substantially equals said preferred gap size, whereby said force is appropriate during forming of said workpiece.

2. The method of claim 1, wherein:

said force adjustment means comprises an inflatable platen between one of said dies and one of said non-inflatable platens; and said step of controlling said force adjustment means comprises controlling the pressure level within said inflatable platen.

3. The method of claim 2, wherein said step of controlling said force adjustment means also includes:

providing a source of pressurized fluid and a conduit coupling said source to said inflatable platen;

transmitting said first and second signals to the input of a controller;

transmitting an output signal of said controller to control a valve means in said conduit, said valve means regulating said pressure within said inflatable platen in response to said output signal of said controller.

4. The method of claim 1 or 2 or 3 including the additional step of providing a buffer platen between said inflatable platen and said dies.

5. In an apparatus for forming a structure comprising a pair of dies adapted to constrain at least one workpiece about its periphery, said at least one workpiece creating an actual gap between said pair of dies, a pair of non-inflatable platens, said dies being positioned between said non-inflatable platens, said dies adapted to apply a clamping force to said at least one workpiece, and means to apply a fluid under pressure to said at least one workpiece to form said at least one workpiece against at least one of said dies, the improvement comprising:

force adjustment means positioned between one of said dies and one of said non-inflatable platens adapted to adjust the force applied by said dies to said at least one workpiece for varying said actual gap between said pair of dies;

sensing means for sensing changes in the size of said actual gap, said sensing means providing a first output signal proportional to the size of said actual gap during said forming of said structure;

a signal generator adapted to provide a second output signal proportional to a preferred gap size that is produced when said force is the minimum amount necessary for acceptable forming of said at least one workpiece; and control means responsive to said first and second output signals for regulating said force adjusting means such that said actual gap size substantially equals said preferred gap size, whereby said force is appropriate during forming of said workpiece.

6. The apparatus of claim 5 wherein said force force adjustment comprises an inflatable platen, and said control means comprises:

a source of pressurized fluid;

a conduit coupling said fluid to said inflatable platen;

a valve means mounted in said conduit for regulating the pressure level within said platen; and a controller responsive to said first and second output signals, said controller providing a signal to said valve means for control thereof.

7. The apparatus of claims 5 or 6 also including a buffer platen between said inflatable platen and said dies.

* * * * *